United States Patent
Barea et al.

(10) Patent No.: US 7,314,843 B2
(45) Date of Patent: Jan. 1, 2008

(54) METHOD FOR SYNTHESIS OF LAMELLAR SOLIDS FROM AN AMINO-ALCOHOL-TYPE ORGANIC STRUCTURING AGENT

(75) Inventors: Eva Barea, Valencia (ES); Vicente Fornes, Valencia (ES); Avelino Corma, Valence (ES); Patrick Bourges, Nanterre (FR); Emmanuelle Guillon, Saint Genis Laval (FR)

(73) Assignee: Institut Francais du Petrole, Rueil MalMaison, Cedex (FR)

( * ) Notice: Subject to any disclaimer, the term of this patent is extended or adjusted under 35 U.S.C. 154(b) by 462 days.

(21) Appl. No.: 11/045,469

(22) Filed: Jan. 31, 2005

(65) Prior Publication Data

US 2005/0191227 A1   Sep. 1, 2005

(30) Foreign Application Priority Data

Jan. 29, 2004   (FR)   ................... 04 00842

(51) Int. Cl.
*B01J 21/16*   (2006.01)
*C01B 33/20*   (2006.01)
*C01B 33/24*   (2006.01)

(52) U.S. Cl. .................. 502/80; 423/333; 423/332; 423/277

(58) Field of Classification Search ............. 423/333, 423/332, 277; 502/80
See application file for complete search history.

(56) References Cited

U.S. PATENT DOCUMENTS

| | | | |
|---|---|---|---|
| 4,657,662 A | 4/1987 | Valyocsik | |
| 4,859,648 A | 8/1989 | Landis et al. | |
| 5,063,039 A | 11/1991 | Valyocsik | |
| 5,236,681 A | 8/1993 | Chu et al. | |
| 2004/0219348 A1* | 11/2004 | Jacquiod et al. | ......... 428/304.4 |

FOREIGN PATENT DOCUMENTS

| | | |
|---|---|---|
| WO | WO 88/00091 | 1/1988 |
| WO | WO 91/12204 | 8/1991 |

* cited by examiner

*Primary Examiner*—Elizabeth D. Wood
(74) *Attorney, Agent, or Firm*—Millen, White, Zelano & Branigan, P.C.

(57) ABSTRACT

The invention relates to a process for synthesis of lamellar solids based on silicates comprising:
 i) a mixing stage, during which a mixture that comprises an alkaline metal, a silica source, water and an organic structuring agent is prepared, and
 ii) a crystallization stage during which this mixture is kept under conditions allowing the formation of a crystalline solid.

Figure 1:
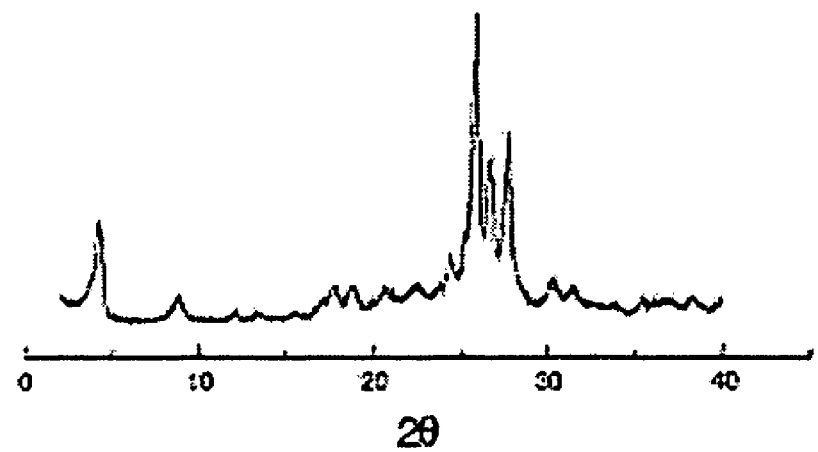

The organic structuring agent that is used in this process comprises an alcohol group and an amine group that are separated by a hydrocarbon chain.

14 Claims, 1 Drawing Sheet

METHOD FOR SYNTHESIS OF LAMELLAR SOLIDS FROM AN AMINO-ALCOHOL-TYPE ORGANIC STRUCTURING AGENT

SCOPE OF THE INVENTION

The invention relates to the scope of the preparation processes of lamellar solids based on silicate, whereby the latter are also known under the name of lamellar solid of phyllosilicate or lamellar silicate type. Silicate-based lamellar solids are defined as compounds containing tetrahedrally coordinated stacked silicon (Si) layers (SiO4). Elements other than silicon Si can be present in the solid that is also in tetrahedral position.

PRIOR ART

Among the lamellar silicates, it is possible to cite magadiite, natrosilite, kenyaite, makatite, nekoite, kanemite, okenite, dehayelite, macdonalite and rhodesite.

These solids often exist in the natural state with a composition such as $A_xSi_yO_z$, $nH2O$, A that can be, for example, a sodium or potassium element. Such lamellar solids are, for example, $Na_2Si_{14}O_{29}9H2O$ for magadiite and $Na_2Si_{20}O_{41}10H_2O$ for kenyaite. Such natural solids have the same composition as the synthetic solids. These solids often have a three-dimensional structure, with Van der Walls-type interactions between the leaves as well as a small specific surface area.

These solids have absorption and exchange properties that are advantageous. These solids are particularly suitable for the adsorption of water or organic molecules as well as for the surface cation exchange. Recently, lamellar silicates had been extensively studied for their capacity to become an acidic solid by protonic exchange. In addition, the introduction of columns into the interlamellar spaces makes it possible to create a mesoporosity and to increase the specific surface area.

It is known from WO 88/00091 to synthesize a bridged lamellar silicate from a lamellar silicate that consists of the synthesis magadiite by using an organic structuring agent that is selected from among the benzyltriethylammonium chloride, benzyltrimethylammonium chloride, dibenzyldimethylammonium chloride, N,N'-dimethylpiperazine, triethylamine, or other quaternary compounds or heterocyclic amines.

It is also known from WO 91/12204 to synthesize a Kenyaite-type crystallized silicate by using an organic compound that is selected from among an alkylamine, a trialkylamine, a tetrallkylammonium compound, and a diamine trimethylhexamethylenediamine compound, whereby said alkyl has 1 to 12 carbon atoms.

SUMMARY DESCRIPTION OF THE INVENTION

The invention relates to a process for synthesis of lamellar solids based on silicates by using an organic structuring agent that comprises an alcohol group and an amine group that are separated by a hydrocarbon chain.

The process for preparation of the invention is, relative to those exhibited in the prior art, more economical and more effective, and it allows the production of lamellar solids in a more reproducible manner.

DETAILED DESCRIPTION OF THE INVENTION

This invention therefore relates to a process for synthesis of silicate-based lamellar solids comprising:
i) a mixing stage, during which a mixture that comprises an alkaline metal M, a silica source $SiO_2$, water, an organic structuring agent A, and optionally another metal X with tetrahedral coordinance is prepared, and
ii) a crystallization stage during which this mixture is kept under conditions that allow the formation of a crystalline solid, in which the organic structuring agent comprises at least one alcohol group and at least one amine group that are separated by a hydrocarbon chain.

Advantageously, the organic structuring agent comprises a single alcohol group and a single amine group.

More preferably, the alcohol group is a terminal group of the organic structuring agent. In the same way, the amine group is preferably a terminal group of the organic structuring agent. Even more preferably, the two alcohol and amine groups are terminal groups of the organic structuring agent.

The organic structuring agent preferably comprises 1 to 20 carbon atoms.

The hydrocarbon chain that separates the two amine and alcohol groups can comprise a linear, cyclic or aromatic alkyl group, preferably cyclic or aromatic.

The organic structuring agent is preferably selected from the group that is formed by the tyramine, 4-aminophenol, trans-4-aminocyclohexanol and the 2-(4-amino-phenyl)-ethanol.

The synthesis process comprises a mixing stage, during which a mixture that comprises an alkaline metal, a silica source, water and an organic structuring agent is prepared.

Alkaline metal M that is incorporated in the stage for preparation of the mixture can be lithium, potassium, sodium and/or calcium. The alkaline metal is preferably sodium.

The silica source incorporated in the stage for preparation of the mixture can be silicate, silica gel, colloidal silica and/or silicic acid.

In addition, a metal X with non-silicic tetrahedral coordinance is preferably incorporated during mixing stage i).

More preferably, metal X is selected from the group that is formed by aluminum, boron, chromium, iron, gallium, indium, nickel, zirconium, cobalt, titanium, copper, niobium and europium.

Even more preferably, metal X is aluminum.

Metal X can be incorporated into the mixture in an oxidized form XOn, or in any other form, such as, for example: $Al_2O_3$, $Al(NO_3)_3$, $Co(CH_3COO)_2$, $Ti(EtO)_4$, $Ni(CH_3COO)_2$, $Zn(CH_3COO)_2$, $Cu(CH_3COO)_2$, $Cr(CH_3COO)_2$, $Eu(CH_3COO)_2$, $Zr(OH)_4$, $Na_2B_4O_7$, $Nb_2O_5$.

The composition of the mixture that is obtained during stage i) can be described as follows:
$SiO_2$:x $M^+OH^-$:y $H_2O$:z A, whereby
x is between 0 and 1, preferably between 0.1 and 0.6
y is greater than 10
z is between 0.05 and 3, preferably between 0.2 and 1

The process for synthesis according to the invention comprises a crystallization stage during which this mixture is kept under conditions that allow the formation of a crystalline solid.

The crystallization stage is generally of hydrothermal type. This stage can be carried out according to any method that is known to one skilled in the art, preferably in an autoclave. The reaction mixture can be vigorously stirred or not for the duration of the crystallization stage.

Advantageously, during crystallization stage ii), the mixture that is obtained during stage i) is heated to a crystallization temperature of between 100 and 200° C., preferably between 135 and 175° C., for a crystallization period of between 1 and 20 days, preferably between 3 and 10 days.

The product that is obtained in crystallization stage ii) is preferably subjected to at least one of the following stages:
iii) a stage for separation of the solid from the crystallization mixture,
iv) a stage for washing the solid, and
v) a stage for drying said solid.

The crystallized solid is generally separated from the mixture by any method that is known to one skilled in the art, such as filtration. The solid is then washed with water, preferably deionized water.

Drying stage v) is generally carried out at a temperature of between 50 and 150° C. for a period of 12 to 30 hours.

The drying is preferably carried out at atmospheric pressure, but can be done under pressure.

The synthesis process according to the invention makes possible, more particularly, the production of a lamellar solid that belongs to the group that is formed by the kenyaite and the magadiite.

The invention also relates to a process for synthesis of bridged lamellar solids based on silicates comprising the synthesis of a lamellar solid, whereby said solid that is obtained is then bridged by intercalation of a bridging agent in the interlamellar space of said solid.

The intercalation of the bridging agent can be carried out by any technique that is known to one skilled in the art.

The insertion of a bridging agent between the silicate layers is carried out such that the columns of the bridging agent are linked to layers of the lamellar solid and the structure of the lamellar solid is maintained, whereby the porosity of the final solid is thereby increased.

Obtaining a bridged lamellar solid from a lamellar solid can be carried out by the following stages:
- a stage for inserting a cationic swelling agent into the lamellar solid that allows the increase of interlamellar space, preferably carried out by cation exchange,
- a stage for inserting a bridging agent into the solid that is obtained in the preceding stage, whereby the bridging agent is preferably selected from among the polyoxocations,
- a stage for washing the solid that is obtained in the preceding stage, and
- a stage for calcination of the washed solid.

The swelling agents can be organic or organometallic chemical radicals or inorganic complexes, preferably provided with a strong positive charge.

In some cases, the calcination stage makes it possible to show the porosity of the bridged lamellar solid. This calcination stage advantageously can be carried out in air, at a temperature of between 300 and 800° C.

After the stage for drying the lamellar solid or after the stage for calcination of the bridged lamellar solid, it is possible to carry out a cation exchange of the alkaline metal that is added to stage i) for mixing with hydrogen ions, which imparts acidity to the final solid.

EXAMPLE 1

Synthesis of the Silicic Kenyaite

A solution that comprises 98% by weight of tyramine and silica, known under the commercial term © Ludox AS-40 marketed by Aldrich, is incorporated in a basic NaOH soda solution (98% by weight) and water.

The mixture is stirred vigorously for two hours. The mixture is then transferred, after homogenization, into a Teflon jacket that is then placed in an autoclave.

The autoclave is heated for 6 hours to 150° C. in an oven. For the synthesis, the autoclave is stirred continuously.

The crystallized product that is obtained is filtered, washed with deionized water (to reach a neutral pH), then dried for one night at 60° C.

The diffractogram that is carried out on the rough synthesis sample is shown in FIG. 1.

EXAMPLE 2

Synthesis of the Silicic Magadiite

A solution that comprises 97% by weight of trans-4-aminocyclohexanol and silica (© Ludox AS-40 marketed by Aldrich) is incorporated in a basic NaOH soda solution (98% by weight) and water.

The mixture is stirred vigorously for two hours. The mixture is then transferred, after homogenization, into a Teflon jacket that is then placed in an autoclave.

The autoclave is heated for 3 hours at 150° C. in an oven. For the synthesis, the autoclave is stirred continuously. The crystallized product that is obtained is filtered, washed with deionized water (to reach a neutral pH), then dried for one night at 60° C.

Figure 2:
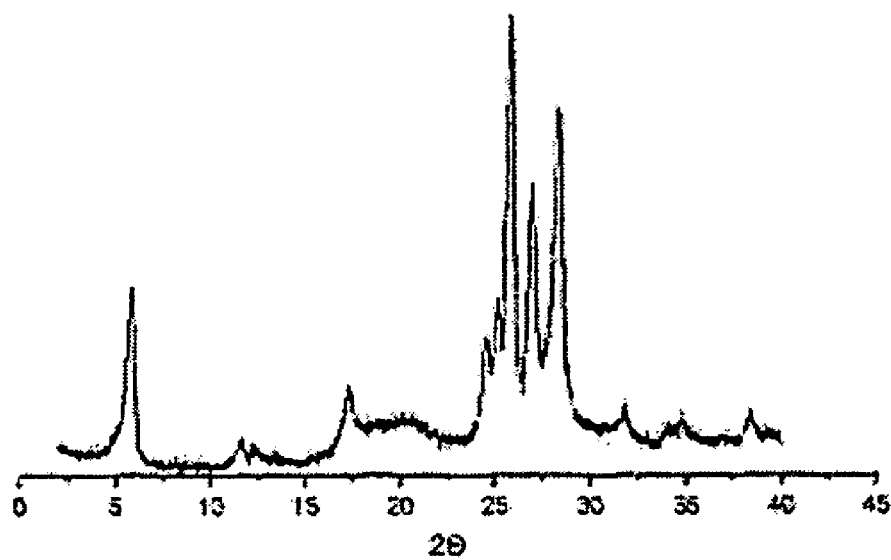

The diffractogram that is carried out on the rough synthesis sample is shown in FIG. 2.

EXAMPLE 3

Kenyaite that is Substituted with a Metal M

A solution that comprises 98% by weight of tyramine and silica (© Ludox AS-40 marketed by Aldrich) is incorporated in a basic NaOH soda solution (98% by weight) and water.

The mixture is stirred vigorously for 15 minutes. An aqueous solution that contains cation M is added to the mixture so as to obtain compositions as described in Table 1 below.

TABLE 1

| Sample | Molar Composition of the Mixture | Period of Synthesis (in Days) |
|---|---|---|
| Co-Kenyaite | SiO2:0.2NaOH:0.50 tyramine:15H2O:1/30–1/100 Co(CH3COO)2 | 10 |
| Ti-Kenyaite | SiO2:0.2NaOH:0.50Tyramine:15H2O:1/50–1/100 Ti(EtO)4 | 9 |
| Ni-Kenyaite | SiO2:0.2NaOH:0.50Tyramine:15H2O:1/50–1/100 Ni(CH3COO)2 | 10 |
| Zn-Kenyaite | SiO2:0.2NaOH:0.50Tyramine:15H2O:1/50–1/100 Zn(CH3COO)2 | 10 |
| Cu-Kenyaite | SiO2:0.2NaOH:0.50Tyramine:15H2O:1/30–1/100 Cu(CH3COO)2 | 10 |
| Nb-Kenyaite | SiO2:0.2NaOH:0.50Tyramine:15H2O:1/50–1/100 Nb2O5 | 7 |
| B-Kenyaite | SiO2:0.2NaOH:0.50Tyramine:15H2O:1/50–1/100 Na2B4O7 | 7 |
| Zr-Kenyaite | SiO2:0.2NaOH:0.50Tyramine:15H2O:1/50–1/100 Zr(OH)4 | 7 |
| Cr-Kenyaite | SiO2:0.2NaOH:0.50Tyramine:15H2O:1/50–1/100 Cr(CH3COO)2 | 10 |
| Cr/Co-Kenyaite | SiO2:0.2NaOH:0.50Tyramine:15H2O:1/100 (Cr + Co) | 10 |

TABLE 1-continued

| Sample | Molar Composition of the Mixture | Period of Synthesis (in Days) |
|---|---|---|
| Eu-Kenyaite | SiO2:0.2NaOH:0.50Tyramine:15H2O:1/50–1/100 Eu(CH3COO)3 | 7 |

The mixtures are then transferred, after homogenization, into a Teflon jacket that is then placed in an autoclave. The autoclave is heated for several days to 150° C. in an oven. During the synthesis, the autoclave is stirred continuously. The crystallized product that is obtained is then filtered, washed with deionized water (to reach a neutral pH), and then dried for one night at 60° C.

EXAMPLE 4

Magadiite that is Substituted with a Metal M

A column that comprises 97% by weight of trans-4-aminocyclohexanol and silica (© Ludox AS-40 marketed by Aldrich) is incorporated in a basic NaOH soda solution (98% by weight), water and cation according to the molar compositions that are described in Table 2 below.

TABLE 2

| Sample | Molar Composition of the Mixture | Period of Synthesis (in Days) |
|---|---|---|
| Al-Magadiite | SiO2:0.2NaOH:0.50Trans-4-aminocyclo-hexanol; 15H2O:1/100 Al2O3 | 3 |
| Co-Magadiite | SiO2:0.2NaOH:0.50Trans-4-aminocyclo-hexanol:15H2O:1/100–1/50 Co(CH3COO)2 | 3 |
| Cu-Magadiite | SiO2:0.2NaOH:0.50Trans-4-aminocyclo-hexanol:15H2O:1/100–1/50 Cu(CH3COO)2 | 3 |
| Ti-Magadiite | SiO2:0.2NaOH:0.50Trans-4-aminocyclo-hexanol:15H2O:1/100–1/50 Ti(EtO)4 | 3 |
| Ni-Magadiite | SiO2:0.2NaOH:0.50Trans-4-aminocyclo-hexanol:15H2O; 1/100–1/50 Ni(CH3COO)2 | 3 |
| Eu-Magadiite | SiO2:0.2NaOH:0.50Trans-4-aminocyclo-hexanol:15H2O:1/100–1/50 Eu(CH3COO)3 | 3 |
| Zr-Magadiite | SiO2:0.2NaOH:0.50Trans-4-aminocyclo-hexanol:15H2O:1/100–1/50 Zr(OH)4 | 3 |
| Cr-Magadiite | SiO2:0.2NaOH:0.50Trans-4-aminocyclo-hexanol:15H2O:1/100–1/50 Cr(CH3COO)3 | 3 |
| Cr/Co-Magadiite | SiO2:0.2NaOH:0.50Trans-4-aminocyclo-hexanol:15H2O:1/100 (Co + Cr) | 3 |

The mixture is stirred vigorously for five hours. The mixture is then transferred, after homogenization, into a Teflon jacket that is then placed in an autoclave.

The autoclave is heated for 3 days at 150° C. in an oven. During the synthesis, the autoclave is stirred continuously. The crystallized product that is obtained is filtered, washed with deionized water (to reach a neutral pH), and then dried for one night at 60° C.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the foregoing and in the following examples, all temperatures are set forth uncorrected in degrees Celsius and, all parts and percentages are by weight, unless otherwise indicated.

The entire disclosure of all applications, patents and publications, cited herein and of corresponding French application No. 0400842, filed Jan. 29, 2005 is incorporated by reference herein.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A process for synthesis of silicate-based lamellar solids comprising:
   i) a stage for mixing, during which a mixture that comprises an alkaline metal, a silica source, water and an organic structuring agent is prepared, and
   ii) a stage for crystallization during which this mixture is kept under conditions that allow the formation of a crystalline solid, characterized in that the organic structuring agent comprises at least one alcohol group and at least one amine group that are separated by a hydrocarbon chain.

2. A process for synthesis according to claim 1, wherein the alcohol group is a terminal group of the organic structuring agent.

3. A process for synthesis according to claim 1, wherein the amine group is a terminal group of the organic structuring agent.

4. A process for synthesis according to claim 1, wherein the organic structuring agent comprises 1 to 20 carbon atoms.

5. A process for synthesis according to claim 1, wherein the organic structuring agent is selected from the group that is formed by tyramine, 4-aminophenol, trans-4-aminocyclohexanol and 2-(4-amino-phenyl)-ethanol.

6. A process for synthesis according to claim 1, wherein during mixing stage i), in addition, a metal X with non-silicic tetrahedral coordinance is incorporated.

7. A process according to claim 6, wherein the metal X is selected from the group that is formed by aluminum, boron, chromium, iron, gallium, indium, nickel, zirconium, cobalt, titanium, copper, niobium and europium.

8. A process for synthesis according to claim 1, wherein during crystallization stage ii), the mixture that is obtained during stage i) is heated to a crystallization temperature of between 100 and 200° C. for a crystallization period of between 1 and 20 days.

9. A process for synthesis according to claim 1, wherein the product that is obtained in crystallization stage ii) is subjected
   iii) to a stage for separation of the solid from the crystallization mixture,
   iv) the thus obtained solid is subjected to a washing stage, and
   v) to a drying stage.

10. A process for synthesis according to claim 9, wherein drying stage v) is carried out at a temperature of between 50 and 150° C. for a period of 12 to 30 hours.

11. A process for synthesis according to claim 1, wherein the lamellar solid that is produced belongs to the group that is formed by Kenyaite and magadiite.

12. A process for synthesis of bridged silicate-based lamellar solids comprising the synthesis of a lamellar solid according to the process of claim 1, whereby said solid that is obtained is then bridged by intercalation of a bridging agent in the interlamellar space of said solid.

13. A process for synthesis according to claim 4, wherein the alcohol group is a terminal group of the organic structuring agent.

14. A process according to claim 4, wherein the alcohol or amine group is a terminal group of the organic structuring agent.

* * * * *